United States Patent
Mantri et al.

(10) Patent No.: US 11,966,515 B2
(45) Date of Patent: Apr. 23, 2024

(54) GESTURE RECOGNITION SYSTEMS AND METHODS FOR FACILITATING TOUCHLESS USER INTERACTION WITH A USER INTERFACE OF A COMPUTER SYSTEM

(71) Applicant: Verizon Patent and Licensing Inc., Basking Ridge, NJ (US)

(72) Inventors: Viraj C. Mantri, Mumbai (IN);
Goldstein D. Daniel, Chennai (IN);
Saikiran N. Chavali, Pune (IN);
Nowfal Edayattu Salam, Kerala (IN);
Ashfaq A. Shakir, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/560,647

(22) Filed: Dec. 23, 2021

(65) Prior Publication Data

US 2023/0205320 A1 Jun. 29, 2023

(51) Int. Cl.
*G06F 3/0482* (2013.01)
*G06F 3/01* (2006.01)
(Continued)

(52) U.S. Cl.
CPC .............. *G06F 3/017* (2013.01); *G06V 40/11* (2022.01); *G06V 40/113* (2022.01); *G06V 40/28* (2022.01)

(58) Field of Classification Search
CPC ...... G06F 16/951; G06F 3/048; G06F 3/0486; G06F 1/00; G06F 3/00; G06F 7/00; G06F 5/00; G06F 8/00; G06F 13/00; G06F 12/00; G06F 11/00; G06F 9/00; G06F 3/017; G06F 3/013; G06F 3/011; G06F 1/163; G06F 3/005; G06F 3/0304; G06F 3/167; G06F 2203/04108; G06F 3/04883; G06F 3/0482; G06F 3/016; G06F 3/0346; G06F 3/04815; G06F 3/04842; G06F 3/0481; G06F 3/04817; G06F 3/0488;
(Continued)

(56) References Cited

U.S. PATENT DOCUMENTS

2004/0193413 A1* 9/2004 Wilson ................ H04N 13/239
382/209
2007/0257891 A1* 11/2007 Esenther ............. G06F 3/04883
345/173
(Continued)

*Primary Examiner* — Rayeez R Chowdhury (57) ABSTRACT

An exemplary method includes a gesture recognition system determining, based on imagery of a user while the user touchlessly interacts with a user interface of a computer system, a configuration of a plurality of landmarks associated with the user and comparing the configuration of the plurality of landmarks to defined landmark configurations associated with a plurality of defined gestures. Each of the plurality of defined gestures may be associated with a different user input enterable by way of the user interface of the computer system. The method may further include the gesture recognition system selecting, based on the comparing of the configuration of the plurality of landmarks to the defined landmark configurations associated with the plurality of defined gestures, a defined gesture included in the plurality of defined gestures, and directing the computer system to enter a user input that is associated with the defined gesture.

20 Claims, 10 Drawing Sheets

(51) Int. Cl.
*G06V 40/10* (2022.01)
*G06V 40/20* (2022.01)

(58) Field of Classification Search
CPC ............ G06F 3/03547; G06F 3/04847; G06F 3/0421; G06F 3/0425; G06F 3/0484; G06F 3/04845; G06F 3/012; G06F 3/0485
See application file for complete search history.

(56) References Cited

U.S. PATENT DOCUMENTS

| | | | |
|---|---|---|---|
| 2010/0231509 A1* | 9/2010 | Boillot | G06F 3/017 606/1 |
| 2011/0129124 A1* | 6/2011 | Givon | G06T 7/75 345/158 |
| 2013/0211843 A1* | 8/2013 | Clarkson | G06F 3/017 704/275 |
| 2013/0329946 A1* | 12/2013 | Archibald | G06V 40/20 382/103 |
| 2015/0237151 A1* | 8/2015 | Lau | G06F 16/951 709/206 |

\* cited by examiner

| Gesture | User Input | Landmark Attributes |
|---|---|---|
| Gesture 402-1 | User Input 404-1 | Landmark Attributes 406-1 |
| Gesture 402-2 | User Input 404-2 | Landmark Attributes 406-2 |
| Gesture 402-3 | User Input 404-3 | Landmark Attributes 406-3 |
| Gesture 402-4 | User Input 404-3 | Landmark Attributes 406-4 |
| ⋮ | ⋮ | ⋮ |
| Gesture 402-N | User Input 404-N | Landmark Attributes 406-N |

GESTURE RECOGNITION SYSTEMS AND METHODS FOR FACILITATING TOUCHLESS USER INTERACTION WITH A USER INTERFACE OF A COMPUTER SYSTEM

BACKGROUND INFORMATION

As computer technology has advanced, various tools have been developed to facilitate users interacting with computer systems. For example, a mouse and a keyboard are typically used to facilitate a user interacting with a user interface of a desktop or laptop computer system. In addition, the advent of touch screen technology has resulted in various types of touch inputs (e.g., taps, swipes, etc.) being developed to facilitate a user controlling a computer system such as a smart phone or a tablet computer by way of a touch screen display. However, there remains room for improvement in user interface technologies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Systems and methods for facilitating touchless user interaction with a user interface of a computer system are described herein. In certain examples, for instance, an exemplary method may include a gesture recognition system determining, based on imagery of a hand of a user while the user touchlessly interacts with a user interface of a computer system, a configuration of a plurality of landmarks associated with the hand of the user and comparing the configuration of the plurality of landmarks to defined landmark configurations associated with a plurality of defined gestures. Each of the plurality of defined gestures may be associated with a different user input enterable by way of the user interface of the computer system. The method may further include the gesture recognition system selecting, based on the comparing of the configuration of the plurality of landmarks to the defined landmark configurations associated with the plurality of defined gestures, a defined gesture included in the plurality of defined gestures and directing the computer system to enter a user input that is associated with the defined gesture.

Various advantages and benefits are associated with the systems and methods for facilitating touchless user interaction with a user interface of a computer system described herein. For example, systems and methods such as those described herein may provide a robust gesture recognition framework that may be used to detect a plurality of different gestures (e.g., hand gestures) touchlessly performed by a user and enter user inputs associated with the plurality of different gestures. In addition, the systems and methods described herein may facilitate an end user of a computer system defining customized gestures that may be used to touchlessly control a user interface of a computer system. These and other benefits that may be provided by systems and methods described herein will be evident from the disclosure that follows.

Figure 1:
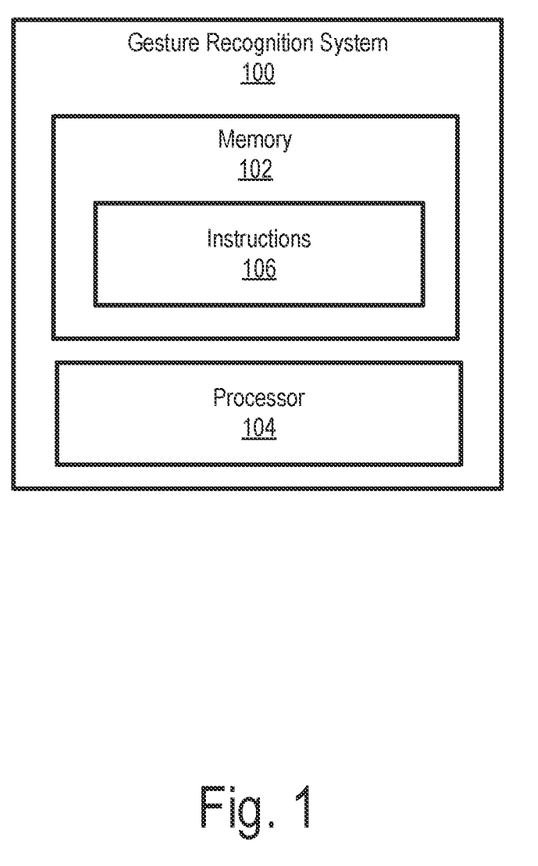
FIG. 1 illustrates an exemplary gesture recognition system according to principles described herein.

FIG. 1 illustrates an exemplary gesture recognition system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with gestures (e.g., pre-defined gestures, user defined gestures, etc.), landmarks associated with a user (e.g., associated with a hand of the user), predefined landmark configurations, landmark attributes, user inputs, notification information, context information, user information, graphical user interface content, and/or any other suitable data.

Processor 104 may be configured to perform (e.g., execute instructions 106 stored in memory 102 to perform) various processing operations associated with recognizing gestures to facilitate touchless interaction with a user interface. For example, processor 104 may perform one or more operations described herein to determine whether a gesture performed by a user corresponds to a gesture that is configured to trigger entry of a user input by way of a user interface. These and other operations that may be performed by processor 104 are described herein.

Figure 2:
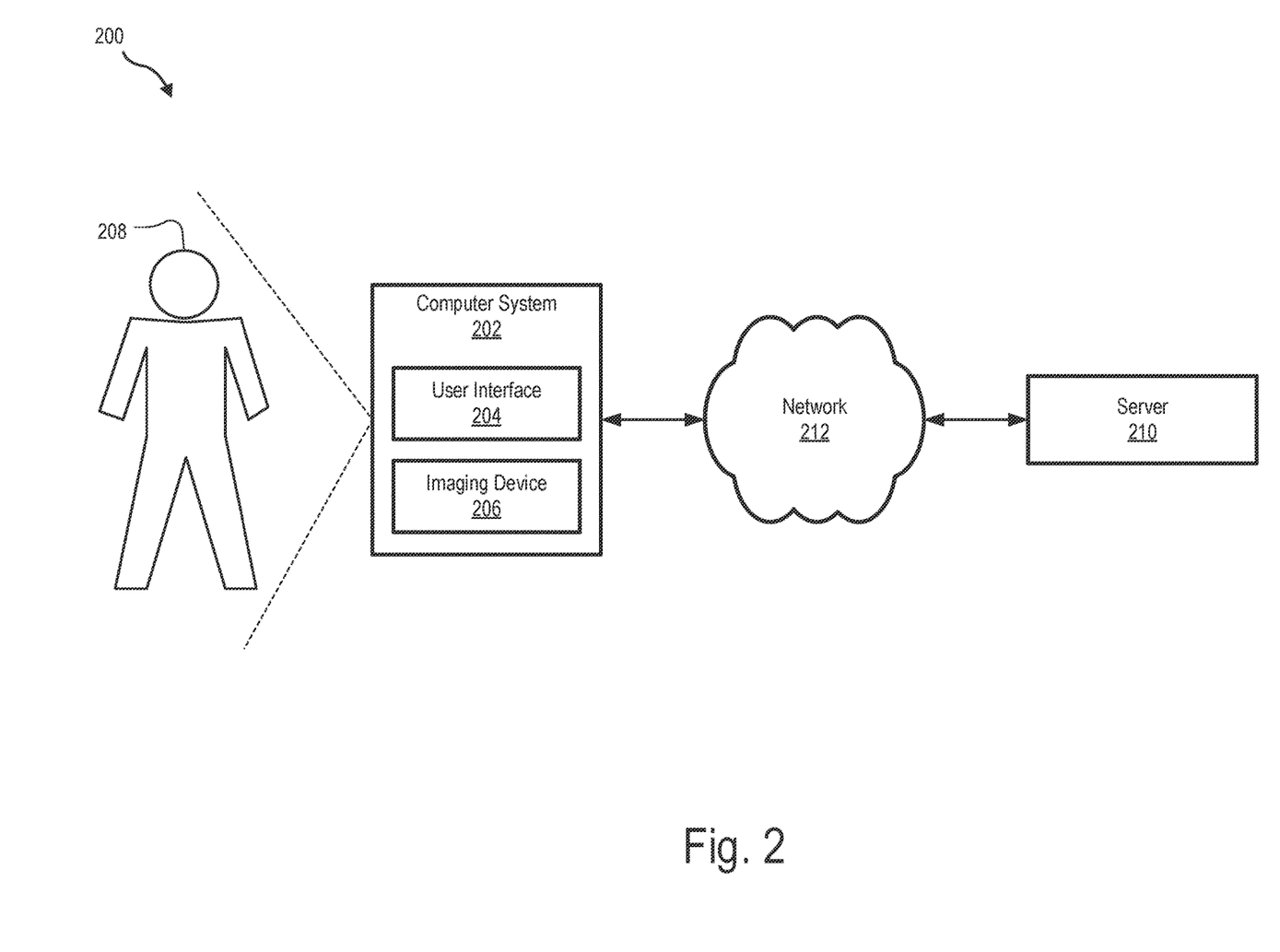
FIG. 2 illustrates an exemplary implementation of the gesture recognition system of FIG. 1 according to principles described herein.

System 100 may be implemented in any suitable manner. FIG. 2 shows an exemplary implementation 200 in which system 100 may be provided in certain examples. As shown in FIG. 2, implementation 200 includes a computer system 202 that includes a user interface 204 and an imaging device 206. Computer system 202 may include or be implemented by any suitable type of computing device or combination of computing devices as may serve a particular implementation. For example, computer system 202 may be implemented by a desktop computer, a laptop computer, a smartphone, a tablet computer, a head mounted display device, a virtual reality ("VR") device, an augmented reality ("AR") device, an internet-of-things ("IoT") device, and/or any other suitable device.

User interface 204 may correspond to any suitable type of user interface as may serve a particular implementation. For example, user interface 204 may correspond to a web interface (e.g., displayed by a display screen of a laptop computer), a holographic display interface, a VR interface, an AR interface, etc.

Imaging device 206 may correspond to any suitable type of imaging device that may be configured to capture imagery of a user 208. For example, imaging device 206 may consist of a camera or other type of image capture device. In certain examples, imaging device 206 may additionally or alternatively include a depth camera configured to capture depth images of user 208. As used herein, "imagery" may include any suitable type of image as may serve a particular implementation. For example, imagery may include a single image (e.g., a still image), a moving image (e.g., a plurality of sequential images), a depth image, and/or any other suitable type of image.

As shown in FIG. 2, computer system 202 is communicatively connected to a server 210 by way of a network 212. Server 210 may include any suitable computing device or system that may facilitate performing any of the operations described herein. In certain examples, server 210 may correspond to a cloud server. In certain examples, server 210 may maintain a gesture database that stores any suitable information, such as described herein, that may be associated with gestures configured to facilitate user 208 touchlessly providing user inputs by way of user interface 204. In certain alternative examples, all or a portion of such a gesture database may be stored internally by computer system 202.

System 100 may be implemented by server 210 or computer system 202. Alternatively, system 100 may be distributed across server 210 and computer system 202, or distributed across server 210, computer system 202, and/or any other suitable computer system/device.

Network 212 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between server 210 and computer system 202. Communications between computer system 202, server 210, and any other system may be transported using any one of the above-listed networks, or any combination or sub-combination of the above-listed networks.

As will be described further herein, system 100 may be configured to determine whether one or more gestures have been performed by user 208 while user 208 touchlessly interacts with computer system 202. As used herein, "touchlessly" means that user 208 does not physically touch computer system 202 (e.g., a display screen of computer system 202) or a peripheral device (e.g., a mouse or a keyboard) associated with computer system 202 to make a gesture associated with a user input. Rather, it is understood that gestures such as those described herein are performed by user 208 in the air at a distance away from computer system 202.

To determine whether user 208 has performed a gesture, system 100 may capture imagery of user 208 while user 208 touchlessly interacts with user interface 204 of computer system 202. System 100 may capture the imagery in any suitable manner. For example, system 100 may capture imagery of a hand of user 208 while user 208 touchlessly interacts with user interface 204 of computer system 202.

In certain examples, system 100 may continually capture imagery of user 208 while user interacts with computer system 202 and may continually perform one or more operations such as those described herein to determine in real-time whether user 208 has performed a gesture.

Based on the imagery captured of user 208 while user 208 touchlessly interacts with user interface 204, system 100 may determine a configuration of a plurality of landmarks associated with a hand of user 208. The configuration of the plurality of landmarks may be indicative of a current pose of the hand of user 208. Any suitable number of landmarks may be used as may serve a particular implementation. For example, the plurality of landmarks may include a first plurality of landmarks of a first finger of the hand of user 208 and a second plurality of landmarks of a second finger of the hand of user 208. The first plurality of landmarks may be indicative of an orientation of the first finger. The second plurality of landmarks may be indicative of an orientation of the second finger in relation to the first finger.

Figure 3:
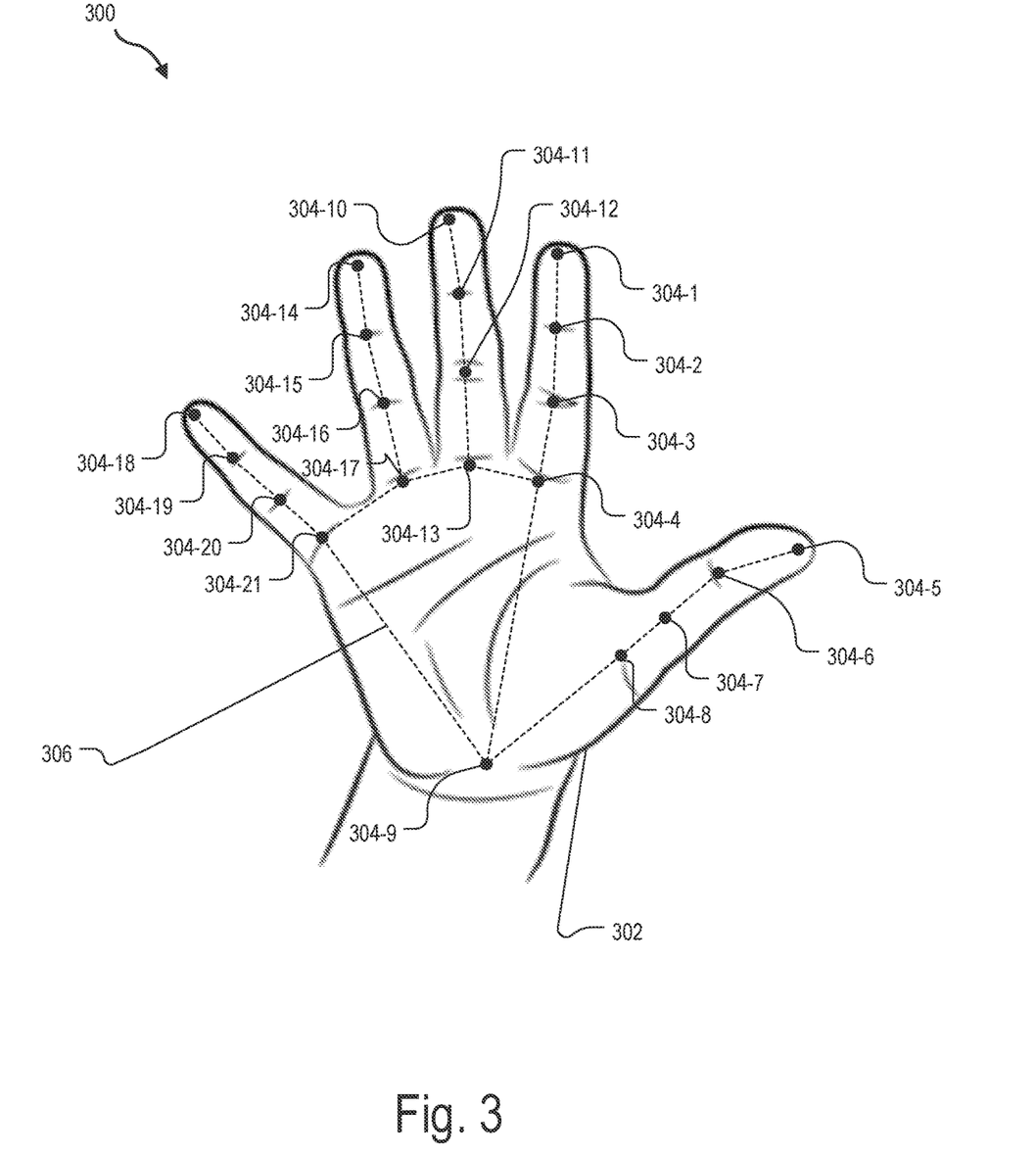
FIG. 3 illustrates an exemplary implementation of landmarks that may be associated with a hand of a user according to principles described herein.

Landmarks such as those described herein may be positioned with respect to any suitable location of the hand of user 208 as may serve a particular implementation. For example, landmarks included in the plurality of landmarks may be at least one of positioned at a joint of a finger on the hand of user 208, positioned at a knuckle on the hand of user 208, positioned at a wrist of user 208, or positioned at a tip of the finger on the hand of user 208. To illustrate, FIG. 3 shows an exemplary implementation 300 that depicts where a plurality of landmarks 304 (e.g., plurality of landmarks 304-1 through 304-21) ("landmarks 304") may be positioned with respect to a hand 302 of user 208. In the example shown in FIG. 3, landmarks 304-1, 304-5, 304-10, 304-14, and 304-18 are positioned at tips of the fingers of hand 302. Landmarks 304-2, 304-3, 304-6, 304-7, 304-11, 304-12, 304-15, 304-16, 304-19, and 304-20 are positioned at joints of the fingers of hand 302. Landmarks 304-4, 304-8, 304-13, 304-17, and 304-21 are positioned at knuckles on hand 302. Landmark 304-9 is positioned at a wrist joint of hand 302.

In the example shown in FIG. 3, landmarks 304 are connected by dashed lines that together form a wireframe representation 306 of a current pose of hand 302. Landmarks 304 and the dashed lines are shown in FIG. 3 for illustrative purposes only. It is understood that landmarks 304 and the dashed lines may not be visibly present on hand 302 while user 208 touchlessly interacts with user interface 204.

System 100 may determine a configuration of landmarks 304 in any suitable manner. For example, based on imagery captured by imaging device 206, system 100 may determine real-time x, y, and z coordinates of each of landmarks 304. In such examples, the x and y coordinates may be the position of a landmark on a two-dimensional axis plane (e.g., the plane of the paper of FIG. 3) and the z coordinate may be the depth along an axis perpendicular to the two-dimensional axis plane (e.g., in a direction perpendicular to the plane of the paper of FIG. 3). Based on the coordinates, system 100 may determine any suitable attributes associated with landmarks 304 that may be used to determine the configuration of landmarks 304. For example, based on the coordinates of landmarks 304, system 100 may mathematically determine a relative angle between a first finger and a second finger of hand 302, an amount of curl of one or more fingers, a distance between tips of a first finger and a second finger, a slope of the fingers, a direction of each of the fingers, and/or any other suitable attribute. In the example shown in FIG. 3, the configuration of landmarks 304 may be used to determine that hand 302 is positioned with the palm facing toward user interface 204 with the fingers pointed in an upwardly extended direction and spaced apart.

System 100 may be configured to determine landmark attributes such as those described above in any suitable manner. For example, system 100 may determine the direction of a finger by using landmarks 304 to determine a length of the finger and a slope of the finger. The length of the finger may be used as a tangent to find the slope of that finger. Based on the slope of the finger, system 100 may determine the direction of the finger using any suitable mathematical formula.

System 100 may determine a distance between two fingers in any suitable manner. To illustrate an example, system 100 may determine a first length of a first finger from the origin of the finger (e.g., at the knuckle) to the tip of the first finger. The first length may correspond to a side (a) of a triangle. System may also determine a second length from the origin of a second finger to the tip of the second finger. The second length may correspond to a side (b) of the triangle. In such an example, the origin of the first finger and the origin of the second finger may be at substantially the same x, y coordinates. An angle (A) between the two sides (a) and (b) may be determined in any suitable manner (e.g., using computer vision). The length of a side (c), which corresponds to the distance between the tips of the first finger and the second finger, of the triangle may then be calculated using the law of cosines: $c^2=a^2+b^2-2ab \cos A$.

System 100 may determine the amount of curl on a finger in any suitable manner. For example, system 100 may determine a slope of a finger, a length of the finger and a direction of a finger to determine the amount of curl of the finger. An exemplary algorithm that may be used to determine the amount of curl of one or more fingers is depicted in FIGS. 8-12.

Figure 4:
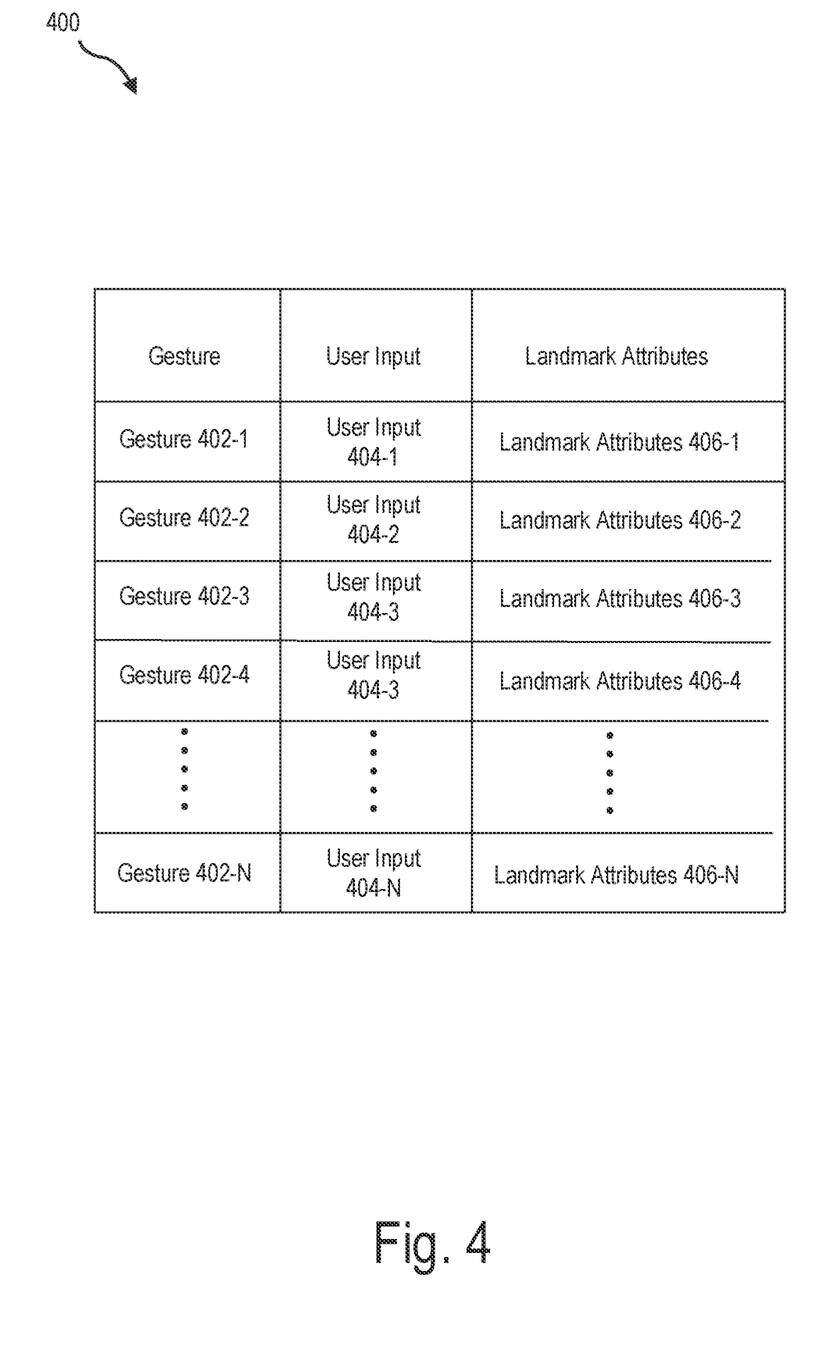
FIG. 4 illustrates an exemplary data configuration showing mapping of gestures, user inputs, and landmark attributes according to principles described herein.

System 100 may compare the configuration of landmarks 304 to defined landmark configurations associated with a plurality of defined gestures. Each of the plurality of defined gestures may be associated with a user input enterable by way of user interface 204 of computer system 202. To that end, system 100 may be configured to maintain or otherwise access data representative of a plurality of defined gestures from any suitable storage location. The plurality of defined gestures may be associated with user inputs and landmark attributes in any suitable manner as may serve a particular implementation. In certain examples, each of the plurality of defined gestures may be mapped to a user input and one or more landmark attributes in a tabular format. To illustrate, FIG. 4 shows an exemplary data configuration 400 for defined gestures that may be implemented in certain examples. As shown in FIG. 4, data configuration 400 includes a plurality of defined gestures 402 (e.g., plurality of defined gestures 402-1 through 402-N) ("gestures 402").

Each of gestures 402 is mapped to a respective one of a plurality of landmark attributes 406 (e.g., plurality of landmark attributes 406-1 through 406-N) ("landmark attributes 406") and a respective one of a plurality of user inputs 404 (e.g., plurality of user inputs 404-1 through 404-N) ("user inputs 404"). For example, gesture 402-1 is mapped to user input 404-1 and landmark attributes 406-1, gesture 402-2 is mapped to user input 404-2 and landmark attributes 406-2, and so forth.

Gestures 402 may represent any suitable type of gesture that may be made by user 208 while interacting with user interface 204. In certain implementations, one or more of gestures 402 may represent a static pose that may be made by hand 302 of user 208 while user 208 touchlessly interacts with user interface 204. For example, a static gesture may correspond to an OK sign, a thumbs up sign, a thumbs down sign, or any other suitable static gesture that may be made with hand 302. In certain alternative implementations, one or more of gestures 402 may represent a dynamic pose that may be made by hand 302 of user 208 while user 208 touchlessly interacts with user interface 204. In such examples, a gesture may include a first pose and a second pose and may require user 208 transitioning hand 302 from the first pose to the second pose for system 100 to determine that the gesture has been made.

User inputs 404 may include any suitable user input that may be associated with a gesture and entered by way of user interface 204. For example, the user input may be a select input, a typing input, a drag and drop input, a size adjustment input, a draw input, a scroll input, a cursor move input, a multiple item selection input, or any other suitable input. To illustrate an example, a cursor movement input may be associated with a gesture in which the index finger pointing in an upwards direction is used to determine whether to move the cursor. In another example, a selection input (e.g., click operation) may be associated with a gesture in which the distance between the index finger and the middle finger of hand 302 is used to determine whether to perform the selection input. In another example, a scroll input may be associated with a pinch gesture in which a relative distance between the thumb and the index finger may be used to determine whether to perform a scroll up or a scroll down operation. In another example, a draw input may be associated with touching the index finger to the thumb.

In certain examples, user inputs 404 may be configured to facilitate user 208 touchlessly controlling or navigating a web page presented to user 208 by way of user interface 204. Such touchless control or navigation of the web page may be performed according to principles described herein without requiring user 208 to physically touch either a display screen or a peripheral device (e.g., a mouse, a keyboard, etc.) associated with computer system 202.

In certain examples, the user input may correspond to an authentication input. In such examples, the gesture or gestures associated with the authentication input may include providing, for example, a signature in the air without use of a physical keyboard or other physical input device. In certain alternative implementations, a password or passcode may be entered by way of a touchless gesture to provide an authentication input. In such examples, each finger may be associated with a specific character or number. In so doing it may be possible to increase security because the password or passcode may need to both be inputted correctly and the correct finger(s) may need to be used to enter each character or number of the password or passcode.

Figure 5:
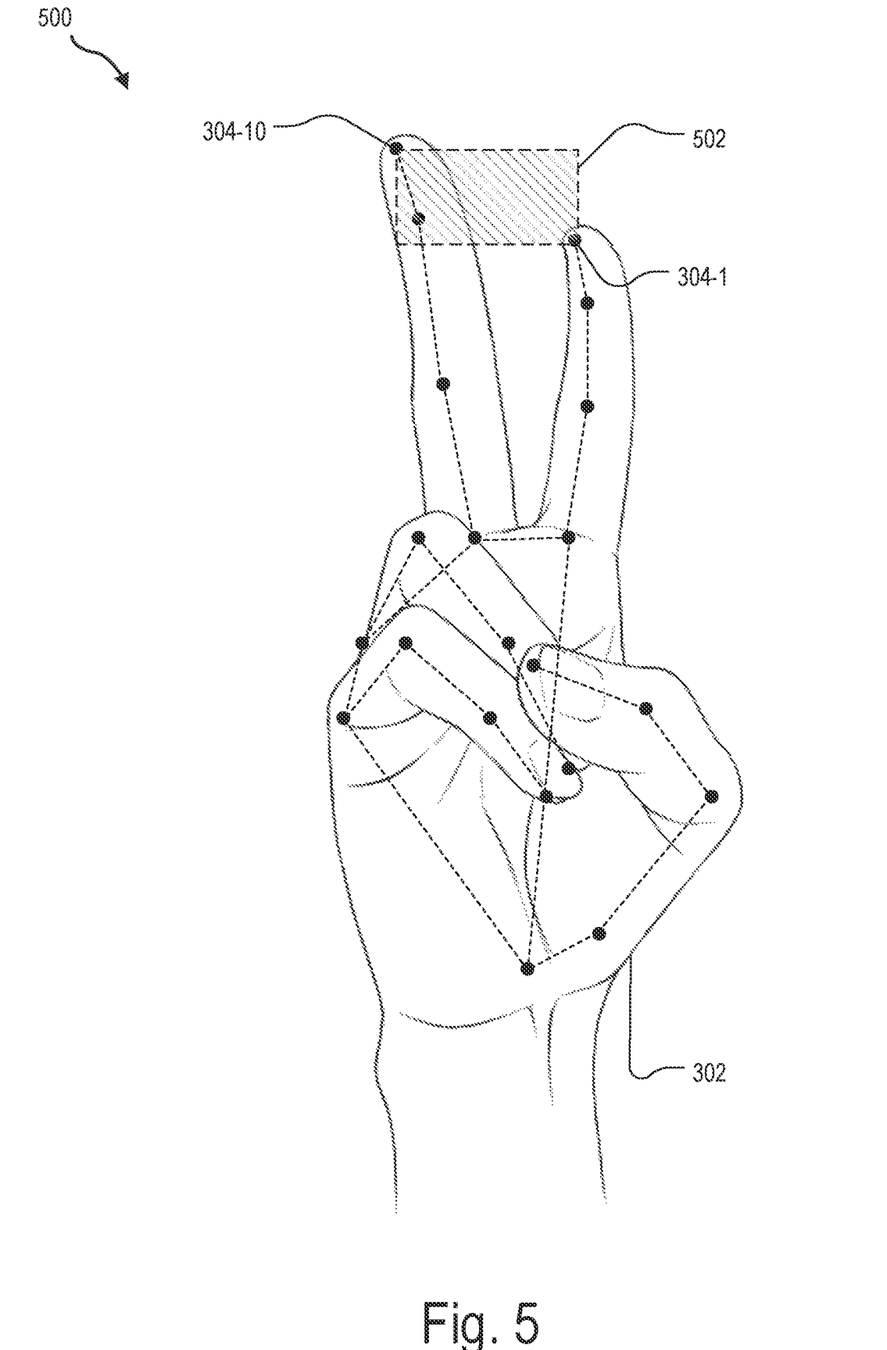
FIG. 5 illustrates an exemplary configuration of landmarks that may be determined while a user performs a gesture according to principles described herein.

Landmark attributes 406 may define one or more requirements for landmarks 304 to satisfy for them to be considered to be in a configuration associated with one of gestures 402. To illustrate an example, FIG. 5 shows an exemplary configuration 500 of landmarks 304 that may be detected while a user attempts to perform, for example, gesture 404-3. In such an example, landmark attributes 406-3 may include the pinky and ring finger being curled and directed in a downward direction, the thumb being curled and a diagonal direction towards the pinky and ring finger, the index and middle finger being straight and directed in an upward direction, and the index and middle finger being separated by at least a predefined distance. Such landmark attributes 406 may be determined in any suitable manner based on the relative positions of landmarks 304. For example, to determine whether the middle and index finger are separated by at least a predefined distance, system 100 may generate a box 502 that has corners defined by landmarks 304-1 and 304-10. System 100 may use imagery captured of hand 302 to monitor the area of box 502 in real-time as user 208 moves the index finger and the ring finger together and apart during interaction with user interface 204. System 100 may determine that the middle and index finger are separated by at least the predefined distance when box 502 has a calculated area greater than a predefined area.

In certain examples, a gesture included in gestures 402 may be associated with a different user input depending on a context in which the gesture is performed. For example, gesture 402-2 may be associated with user input 404-2 when gesture 402-2 is performed in a first context. However, gesture 402-2 may be associated with a user input other than user input 404-2 if gesture 402-2 is performed in a second context. Any suitable context may be used to further classify gestures 402 as may serve a particular implementation. For example, gestures 402 may be classified based on location, surroundings, time, platform (e.g., smartphone, desktop computer, smart TV, etc.), application, and/or any other suitable context. In so doing, the same gesture may be used to provide different user inputs depending on the context in which the gesture is performed.

Based on the comparing of the configuration of landmarks 304 to defined landmark configurations associated with gestures 402, system 100 may select one of gestures 402 as being substantially a match to the gesture performed by user 208. This may be accomplished in any suitable manner. For example, system 100 may continually monitor imagery of hand 302. When the configuration of landmarks 304 satisfies one of landmark attributes 406, system 100 may select the corresponding gesture associated with the satisfied landmark attributes 406. Continuing with the example depicted in FIG. 5, system 100 may select gesture 402-3 if the configuration of landmarks 304 satisfies all of landmark attributes 406-3 (e.g., the pinky and ring finger are curled and directed in a downward direction, the thumb is curled and directed towards the pinky and ring finger, the index and middle finger are straight and directed in an upward direction, and the index and middle finger are separated by at least a predefined distance).

After system 100 selects the defined gesture, system 100 may direct computer system 202 to enter a user input associated with the defined gesture. This may be accomplished in any suitable manner. For example, system 100 may access data configuration 400 and determine that gesture 402-3 is associated with user input 404-3. Based on this association, system 100 may transmit any suitable command to computer system 202 directing computer system 202 to enter user input 404-3 upon selection of gesture 402-3.

In certain examples, system 100 may facilitate user 208 defining customized gestures that may be used to facilitate interaction with user interface 204 of computer system 202. To that end, system 100 may receive a request from user 208 to define a gesture usable to touchlessly provide a user input to user interface 204 of computer system 202. System 100 may receive the request in any suitable manner. For example, system 100 may receive the request based on user 208 accessing any suitable settings menu configured to facilitate defining gestures.

In response to the request, system 100 may initiate a gesture definition process. During such a gesture definition process, system 100 may obtain imagery of hand 302 of user 208 while hand 302 performs a gesture that the user wants to define and associate with a user input selected by user 208. System 100 may determine coordinates of a plurality of landmarks of hand 302 while hand 302 performs the gesture. Based on the determined coordinates, system 100 may record attributes of the plurality of landmarks. The attributes of the plurality of landmarks may represent parameters that need to be satisfied to determine whether the gesture has been made. System 100 may then map the attributes of the plurality of landmarks to the user input selected by user 208. With such a mapping, system 100 may direct computer system 202 to enter the user input selected by user 208 each time user 208 makes a gesture that satisfies the landmark attributes mapped to the user input.

System 100 may facilitate user 208 defining any suitable number of additional gestures that may be useable to touchlessly provide additional user inputs to user interface 204 of computer system 202. In such examples, system 100 may receive an additional request from user 208 to define an additional gesture usable to touchlessly provide an additional user input to user interface 204 of computer system 202. In response to the additional request, system 100 may perform an additional gesture definition process in which system 100 obtains additional imagery of hand 302 of user 208 and records attributes of an additional plurality of landmarks associated with hand 302 of user 208 while user 208 performs the additional gesture. System 100 may then map the attributes of the additional plurality of landmarks to the additional gesture.

In certain examples, system 100 may facilitate user 208 changing which gesture is usable to touchlessly provide a particular user input to user interface 204 of computer system 202. For example, system 100 may facilitate user 208 changing from a first gesture being used for a particular user input to a second gesture being used for the particular user input. This may be accomplished in any suitable manner such as described herein.

Figure 6:
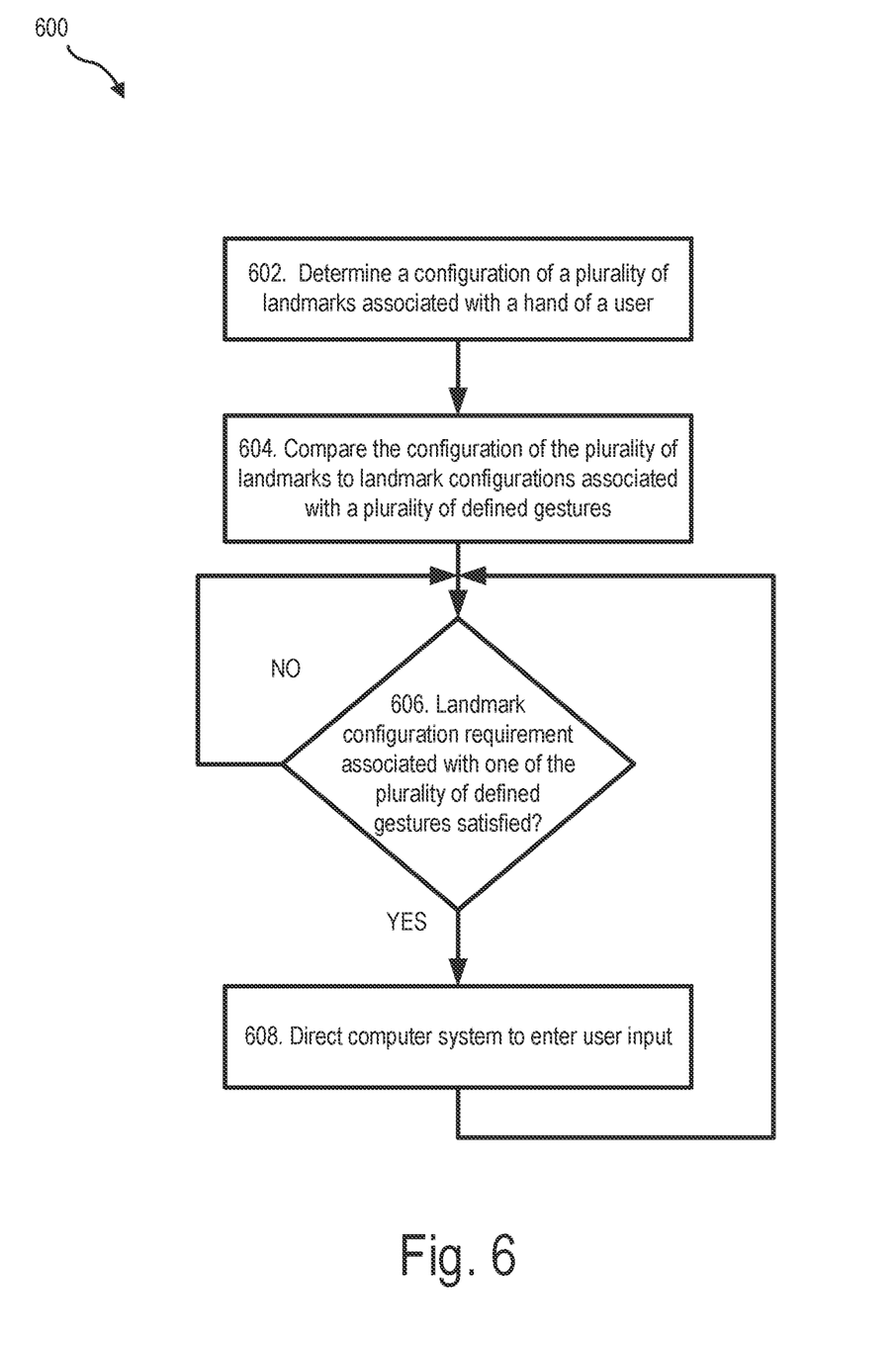
FIG. 6 illustrates and exemplary flow chart depicting various operations that may be performed according to principles described herein.

FIG. 6 depicts a flowchart 600 showing exemplary operations that may be performed by system 100 to facilitate touchless user interaction with user interface 204 of computer system 202. At operation 602, system 100 may determine a configuration of a plurality of landmarks associated with a hand of user 208. This may be accomplished in any suitable manner. For example, system 100 may analyze imagery of the hand of user 208 in real-time and may determine real-time coordinates of each of the plurality of landmarks. System 100 may also determine one or more landmark attributes associated with the configuration of the plurality of landmarks.

At operation 604, system 100 may compare the configuration of the plurality of landmarks to landmark configurations associated with a plurality of defined gestures 402. For example, system 100 may compare landmark attributes associated with the configuration of the plurality of landmarks to each of landmark attributes 406.

At operation 606, system 100 may determine whether a landmark configuration requirement associated with one of the plurality of defined gestures is satisfied. For example, system 100 may determine whether the configuration of the plurality of landmarks satisfies landmark configuration requirements defined by one of landmark attributes 406. If the answer at operation 606 is "NO," the flow may return to before operation 606. If the answer at operation 606 is "YES," system 100 may direct computer system 202 to enter a user input associated with a satisfied landmark configuration requirement at operation 608.

After system 100 directs computer system 202 to enter the user input, the flow may return to before operation 606. System 100 may then repeat operations 606 and 608 any suitable number of times as user 208 makes different gestures to touchlessly interact with user interface 204 of computer system 202.

Figure 7:
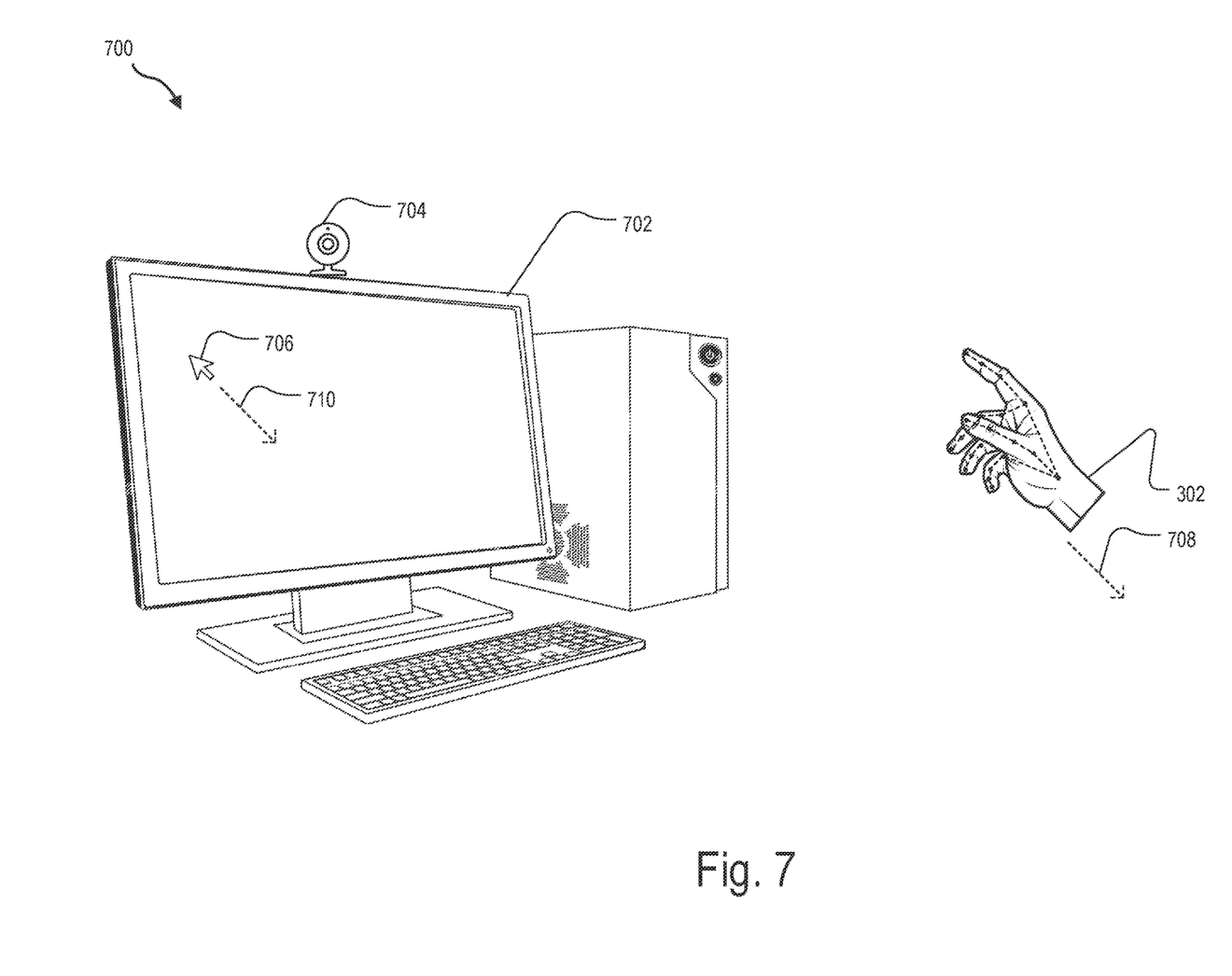
FIG. 7 illustrates another exemplary implementation of the gesture recognition system of FIG. 1 according to principles described herein.

FIG. 7 illustrates an exemplary implementation 700 in which system 100 may be provided in certain examples. In the example shown in FIG. 7, hand 302 of user 208 may be used to touchlessly control a user interface provided for display on a display screen 702 of a desktop computer. A camera 704 is communicatively coupled to the desktop computer and configured to capture imagery that may be used such as described herein to determine whether user 208 has performed a predefined gesture. In the example shown in FIG. 7, hand 302 is making a gesture that may be configured to control movement of a cursor 706 displayed in the user interface on display screen 702. System 100 may determine that hand 302 is making a gesture configured to control movement of cursor 706 based on landmarks of hand 302 indicating that the index finger of hand 302 is extended upwards and that the middle, ring, and pinky fingers of hand 302 are curled and in a downward direction. While hand 302 maintains the gesture shown in FIG. 7, system 100 may direct the desktop computer to move cursor 706 at any suitable position on display screen 702 based on movement of hand 302 in the air. For example, movement of hand 302 in the direction of arrow 708 while maintaining the gesture shown in FIG. 7 may result in cursor 706 moving in the direction of arrow 710 in the user interface displayed on display screen 702.

In certain examples, gestures such as those described herein may facilitate touchless interaction with a live keyboard displayed by way of user interface 204. In such examples, user interface 204 may display a plurality of icons each representing a key of a keyboard (e.g., in a qwerty key layout). User 208 may touchlessly interact with the live keyboard in any suitable manner to type text in an entry field displayed in user interface 204. In certain examples, a letter on the live keyboard may be highlighted where a cursor is currently positioned. System 100 may detect a first gesture performed by user to move the cursor to highlight a different letter on the keyboard. System 100 may then detect a second gesture performed by user 208 with respect to the highlighted letter to select the highlighted letter. The selected highlighted letters may then be displayed in the entry field of user interface 204. System 100 may detect the first and second gestures any suitable number of times as user 208 touchlessly interacts with user interface 204 to perform a text entry operation.

In certain examples, gestures such as those described herein may facilitate system 100 determining attributes associated with content displayed by way of user interface 204. To illustrate an example, a plan view floor plan of a structure such as a house may be displayed by way of user interface 204. System 100 may detect a gesture performed by user 208 to draw a perimeter of a shape represented in the plan view of the floor plan. For example, system 100 may detect a gesture that draws a box around a perimeter of a bedroom represented in the floor plan. System 100 may extract pixel coordinates across the box. Based on the pixel coordinates, system 100 may calculate a distance between the pixels on the line drawn from a start point to an end point to determine the perimeter of the box. System 100 may divide the perimeter by 4 to determine a length of one side of the box. System may then predict the shape of the box using any suitable methodology. For example, system 100 may use NeuralNet and/or any suitable machine learning algorithm to predict the shape. System 100 may calculate the length of the box and may use the shape and length of the box to calculate the area of the box.

For simplicity, the preceding disclosure describes exemplary gestures that may be made by one hand of a user while touchlessly interacting with a user interface. However, it is understood that system 100 may be configured to recognize any suitable gestures that may be made concurrently by both hands of a user. In such examples, system 100 may detect a first plurality of landmarks associated with a first hand of the user and a second plurality of landmarks associated with a second hand of the user. System 100 may detect any suitable landmark attributes associated with the first plurality of landmarks and the second plurality of landmarks to determine whether the user has performed a gesture using both hands at the same time.

Additionally or alternatively, it is understood that concepts such as those described herein may be used to recognize gestures other than those made by one or more hands of a user. For example, system 100 may be configured to detect landmarks associated with arms, legs, etc. that may be additionally or alternatively used to recognize different gestures in certain implementations.

Figure 8:
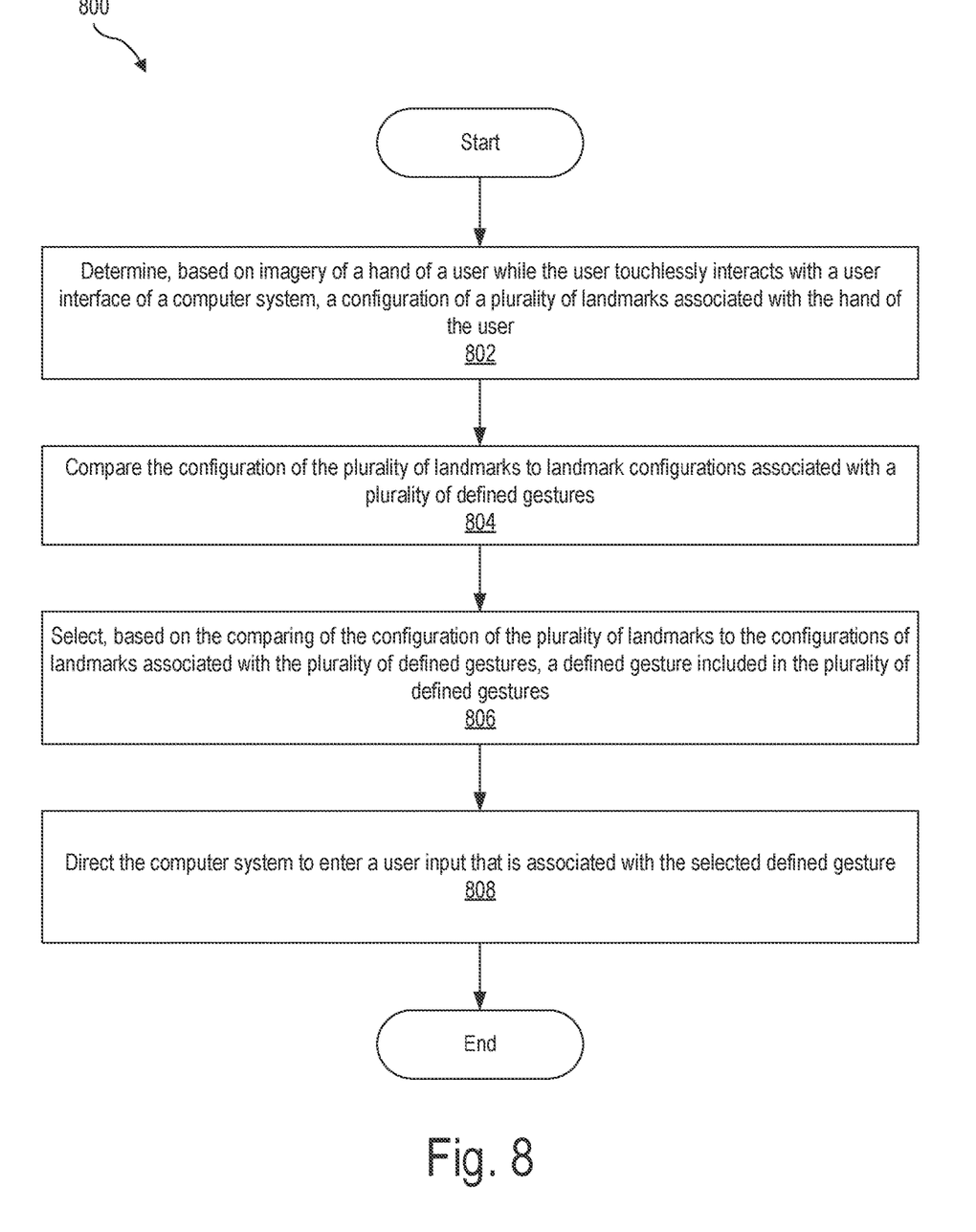
FIGS. 8-9 illustrate exemplary methods for facilitating touchless user interaction with a user interface of a computer system according to principles described herein.

FIG. 8 illustrates an exemplary method 800 for facilitating touchless user interaction with a user interface of a computer system. While FIG. 8 illustrates exemplary operations according to one embodiment, other embodiments may add to and/or modify the operations shown in FIG. 8. The operations shown in FIG. 8 may be performed by system 100, any components included therein, and/or any implementation thereof.

At operation 802, a gesture recognition system (e.g., gesture recognition system 100) may determine, based on imagery of a hand of a user while the user touchlessly interacts with a user interface of a computer system, a configuration of a plurality of landmarks associated with the hand of the user. Operation 802 may be performed in any of the ways described herein.

At operation 804, the gesture recognition system may compare the configuration of the plurality of landmarks to defined landmark configurations associated with a plurality of defined gestures. As described herein, each of the plurality of defined gestures may be associated with a different user input enterable by way of the user interface of the computer system. Operation 804 may be performed in any of the ways described herein.

At operation 806, the gesture recognition system may select, based on the comparing of the configuration of the plurality of landmarks to the defined landmark configurations associated with the plurality of defined gestures, a defined gesture included in the plurality of defined gestures. Operation 806 may be performed in any of the ways described herein.

At operation 808, the gesture recognition system may direct the computer system to enter a user input that is associated with the defined gesture. Operation 808 may be performed in any of the ways described herein.

Figure 9:
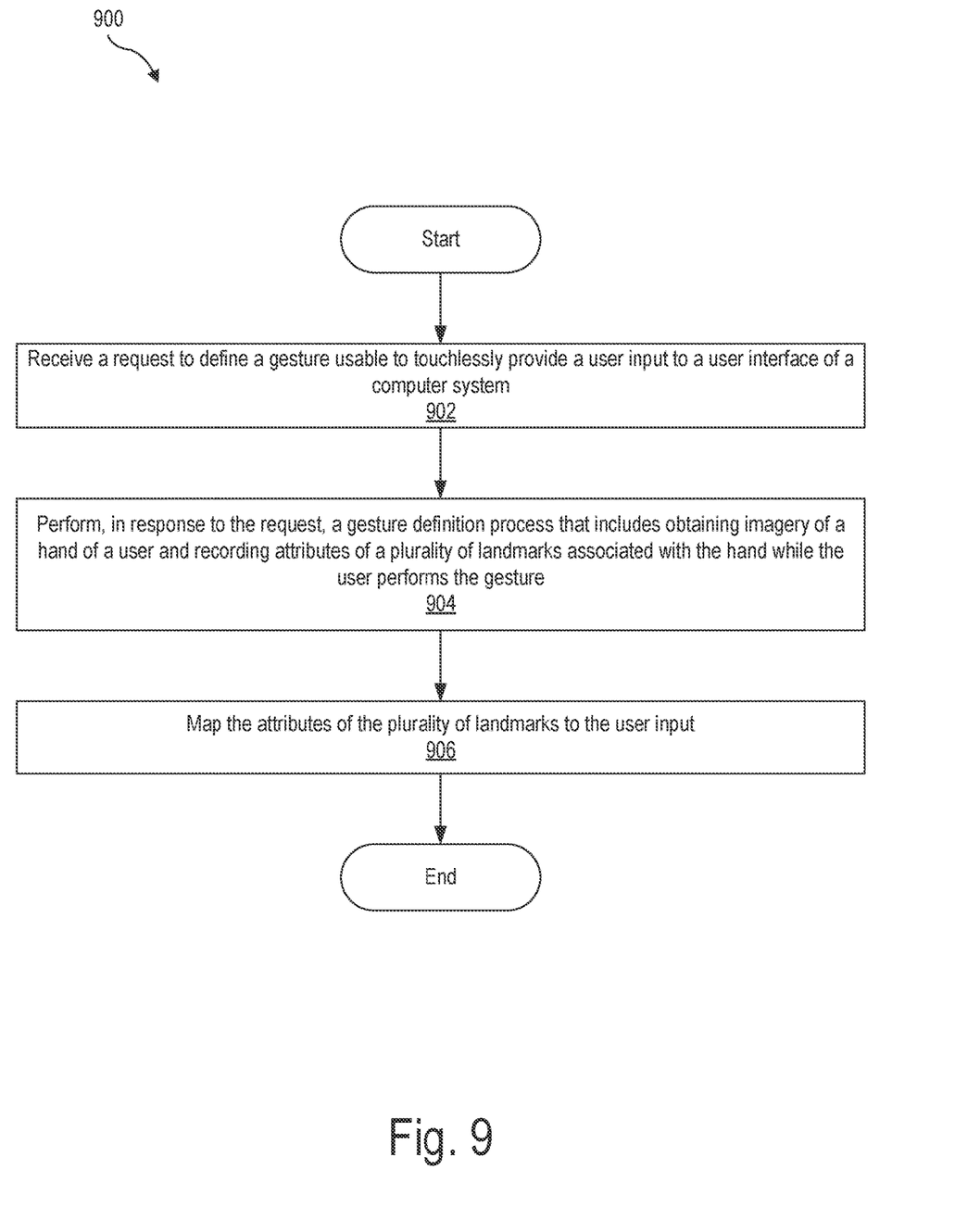

FIG. 9 illustrates an additional exemplary method 900 for facilitating touchless user interaction with a user interface of a computer system. While FIG. 9 illustrates exemplary operations according to one embodiment, other embodiments may add to and/or modify the operations shown in FIG. 9. The operations shown in FIG. 9 may be performed by system 100, any components included therein, and/or any implementation thereof.

At operation 902, a gesture recognition system (e.g., gesture recognition system 100) may receive, from a user of a computer system, a request to define a gesture usable to touchlessly provide a user input to a user interface of the computer system. Operation 902 may be performed in any of the ways described herein.

At operation 904, the gesture recognition system may perform, in response to the request, a gesture definition process. Such a gesture definition process may include the gesture recognition system obtaining imagery of a hand of the user and recording attributes of a plurality of landmarks associated with the hand of the user while the user performs the gesture. Operation 904 may be performed in any of the ways described herein.

At operation 906, the gesture recognition system may map the attributes of the plurality of landmarks to the user input. Operation 906 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 10:
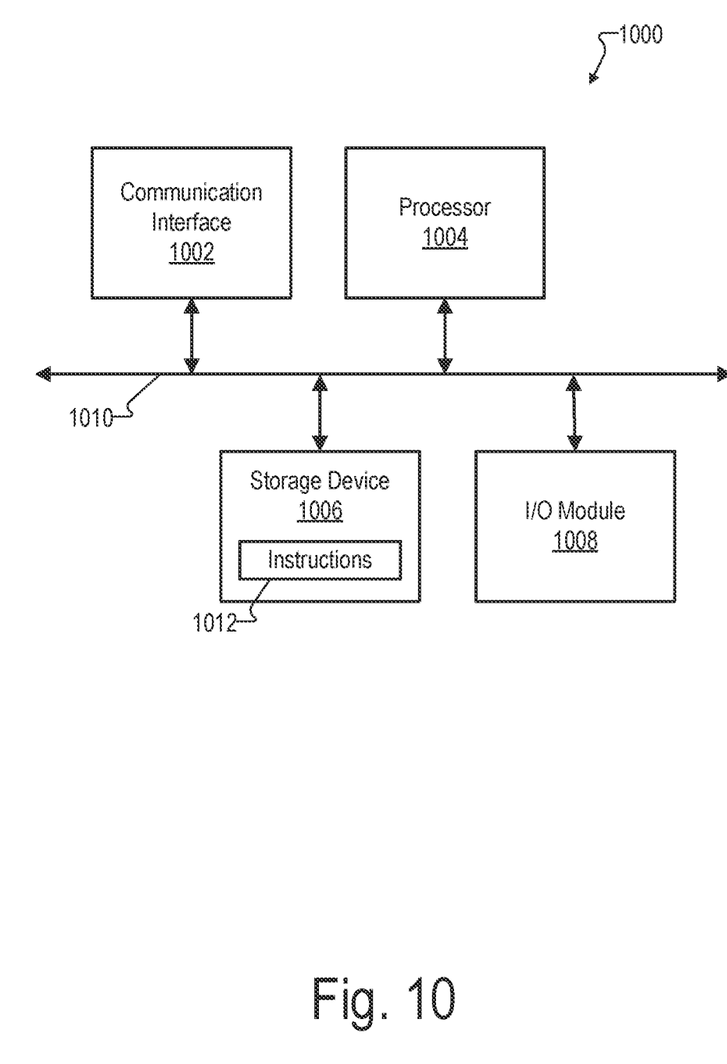
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output (I/O) module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more location databases residing within storage device 1006.

I/O module 1008 may include one or more I/O modules configured to receive user input and provide user output. One or more I/O modules may be used to receive input for a virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, memory 102 may be implemented by storage device 1006, and processor 104 may be implemented by processor 1004.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by a gesture recognition system and based on imagery of a hand of a user while the user touchlessly interacts with a user interface of a computer system, a configuration of a plurality of landmarks associated with the hand of the user;
    comparing, by the gesture recognition system, the configuration of the plurality of landmarks to defined landmark configurations associated with a plurality of defined gestures, each of the plurality of defined gestures associated with a different user input enterable by way of the user interface of the computer system;
    selecting, by the gesture recognition system and based on the comparing of the configuration of the plurality of landmarks to the defined landmark configurations associated with the plurality of defined gestures, a defined gesture included in the plurality of defined gestures;
    wherein:
        the determining of the configuration of the plurality of landmarks includes determining, based on the plurality of landmarks, a distance between a first finger of the hand of the user and a second finger of the hand of the user; and
        the determining of the distance between the first finger and the second finger includes:
            generating a box having a first corner defined by a first landmark included in the plurality of landmarks and a second corner defined by a second landmark included in the plurality of landmarks; and
            determining that the first finger and the second finger are separated by the distance based on a calculated area of the box being greater than a predefined area; and
    directing, by the gesture recognition system and based on the calculated area of the box being greater than the predefined area, the computer system to enter a user input that is associated with the defined gesture.

2. The method of claim 1, wherein the defined gesture represents a static pose made by the hand of the user while the user touchlessly interacts with the user interface of the computer system.

3. The method of claim 1, wherein the defined gesture represents a dynamic pose made by the hand of the user while the user touchlessly interacts with the user interface of the computer system.

4. The method of claim 1, wherein the imagery of the hand of the user corresponds to a single image of the hand of the user.

5. The method of claim 1, wherein the imagery of the hand of the user corresponds to a plurality of sequential images of the hand of the user.

6. The method of claim 1, wherein the determining of the configuration of the plurality of landmarks includes determining real-time coordinates for each landmark included in the plurality of landmarks.

7. The method of claim 1, wherein the determining of the configuration of the plurality of landmarks further includes determining at least one of an amount of curl of at least one of the first finger or the second finger, or a direction of at least one of the first finger or the second finger.

8. The method of claim 7, wherein:
    the determining of the configuration of the plurality of landmarks includes determining the direction of the first finger; and
    the determining of the direction of the first finger includes determining at least one of a length of the first finger or a slope of the first finger.

9. The method of claim 1, wherein landmarks included in the plurality of landmarks are at least one of positioned at a joint of a finger on the hand of the user, positioned at a knuckle on the hand of the user, positioned at a wrist of the user, or positioned at a tip of the finger on the hand of the user.

10. The method of claim 1, wherein the user input is configured to touchlessly control a web page presented to the user by way of the user interface of the computer system.

11. The method of claim 1, wherein the user input is one of a select input, a typing input, a drag and drop input, a size adjustment input, a draw input, a scroll input, or a cursor move input.

12. A system comprising:
    a memory that stores instructions; and
    a processor communicatively coupled to the memory and configured to execute the instructions to:
        determine, based on imagery of a hand of a user while the user touchlessly interacts with a user interface of a computer system, a configuration of a plurality of landmarks associated with the hand of the user;
        compare the configuration of the plurality of landmarks to defined landmark configurations associated with a plurality of defined gestures, each of the plurality of defined gestures associated with a different user input enterable by way of the user interface of the computer system;
        select, based on the comparing of the configuration of the plurality of landmarks to the defined landmark configurations associated with the plurality of defined gestures, a defined gesture included in the plurality of defined gestures;
    wherein:
        the determining of the configuration of the plurality of landmarks includes determining, based on the plurality of landmarks, a distance between a first finger of the hand of the user and a second finger of the hand of the user; and
        the determining of the distance between the first finger and the second finger includes:
            generating a box having a first corner defined by a first landmark included in the plurality of landmarks and a second corner defined by a second landmark included in the plurality of landmarks; and
            determining that the first finger and the second finger are separated by the distance based on a calculated area of the box being greater than a predefined area; and direct the computer system to enter, based on the calculated area of the box being greater than the predefined area, a user input that is associated with the defined gesture.

13. The system of claim 12, wherein landmarks included in the plurality of landmarks are at least one of positioned at a joint of a finger on the hand of the user, positioned at a knuckle on the hand of the user, or positioned at a tip of the finger on the hand of the user.

14. The system of claim 12, wherein the user input is configured to control a web page presented to the user by way of the user interface of the computer system.

15. The method of claim 1, wherein:
the determining of the configuration of the plurality of landmarks includes determining, based on the plurality of landmarks, an additional distance between a third finger of the hand of the user and a fourth finger of the hand of the user; and
the determining of the distance between the third finger and the fourth finger includes:
generating an additional box having a third corner defined by a third landmark included in the plurality of landmarks and a fourth corner defined by a fourth landmark included in the plurality of landmarks; and
determining that the third finger and the fourth finger are separated by the additional distance based on a calculated area of the additional box being greater than an additional predefined area.

16. A computer program product embodied in a non-transitory computer readable storage medium and comprising computer instructions for:
determining, based on imagery of a hand of a user while the user touchlessly interacts with a user interface of a computer system, a configuration of a plurality of landmarks associated with the hand of the user;
comparing the configuration of the plurality of landmarks to defined landmark configurations associated with a plurality of defined gestures, each of the plurality of defined gestures associated with a different user input enterable by way of the user interface of the computer system;
selecting, based on the comparing of the configuration of the plurality of landmarks to the defined landmark configurations associated with the plurality of defined gestures, a defined gesture included in the plurality of defined gestures;
wherein:
the determining of the configuration of the plurality of landmarks includes determining, based on the plurality of landmarks, a distance between a first finger of the hand of the user and a second finger of the hand of the user; and
the determining of the distance between the first finger and the second finger includes:
generating a box having a first corner defined by a first landmark included in the plurality of landmarks and a second corner defined by a second landmark included in the plurality of landmarks; and
determining that the first finger and the second finger are separated by the distance based on a calculated area of the box being greater than a predefined area; and
directing, based on the calculated area of the box being greater than the predefined area, the computer system to enter a user input that is associated with the defined gesture.

17. The computer program product of claim 16, wherein the defined gesture represents a static pose made by the hand of the user while the user touchlessly interacts with the user interface of the computer system.

18. The computer program product of claim 16, wherein the defined gesture represents a dynamic pose made by the hand of the user while the user touchlessly interacts with the user interface of the computer system.

19. The computer program product of claim 16, wherein the determining of the configuration of the plurality of landmarks includes determining real-time coordinates for each landmark included in the plurality of landmarks.

20. The computer program product of claim 16, wherein the imagery of the hand of the user corresponds to a plurality of sequential images of the hand of the user.

* * * * *